United States Patent [19]
Kanno et al.

[11] 3,724,949
[45] Apr. 3, 1973

[54] ELECTROPHOTOGRAPHIC COPYING APPARATUS PROVIDED WITH AN AUTOMATIC ELEVATIONAL ORIGINAL KEEP-PLATE

[75] Inventors: Tadaaki Kanno, Isoga-ku, Yokohama-shi, Kanagawa-ken; Minoru Iwamoto, Shinagawa-ku, Tokyo, both of Japan

[73] Assignee: Ricoh Co., Ltd., Tokyo, Japan

[22] Filed: Dec. 3, 1971

[21] Appl. No.: 204,575

[30] Foreign Application Priority Data

Dec. 7, 1970 Japan..............................45/108252

[52] U.S. Cl......................................355/75, 355/14
[51] Int. Cl...........................................G03b 27/62
[58] Field of Search.......................355/75, 76, 115

[56] References Cited

UNITED STATES PATENTS

| | | | |
|---|---|---|---|
| 3,615,134 | 10/1971 | Newcomb | 355/75 |
| 3,198,069 | 8/1965 | Florsheim, Jr. et al. | 355/75 |
| 3,617,122 | 11/1971 | Saito | 355/76 |
| 3,642,371 | 2/1972 | Jones et al. | 355/115 |
| 3,190,204 | 6/1965 | Limberger | 355/115 |

Primary Examiner—Samuel S. Matthews
Assistant Examiner—Russell E. Adams, Jr.
Attorney—Henry T. Burke et al.

[57] ABSTRACT

A copying apparatus having an automatically elevatable original keep-plate which is normally maintained in contact with the original-receiving exposure surface when the apparatus is inoperative but which is moved upwardly to an upper position when the power switch is actuated to permit an original to be placed on the exposure surface. Actuation of the print switch moves the keep-plate downwardly to its lower position where it holds down the original and permits initiation of duplication. A change-over member is provided for switching the elevational movement of the keep-plate between manual and automatic operation, whereby during manual operation, the keep-plate moves in an elevational motion only once while one or a number of duplication cycles may take place with a single original; and during automatic operation, the keep-plate moves in elevational motion and dwells for a predetermined time interval in its upper position each times a series of duplication cycles is performed to permit the old original on the exposure surface to be replaced by a new original prior to beginning the next series of duplication cycles thus producing a predetermined number of duplicates of a plurality of originals. Suitable mechanism and circuitry are disclosed for achieving the desired operations.

10 Claims, 10 Drawing Figures

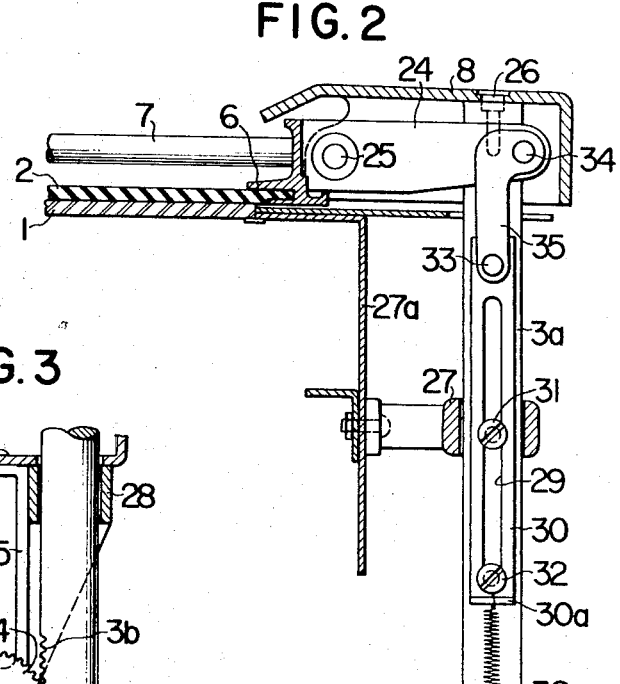
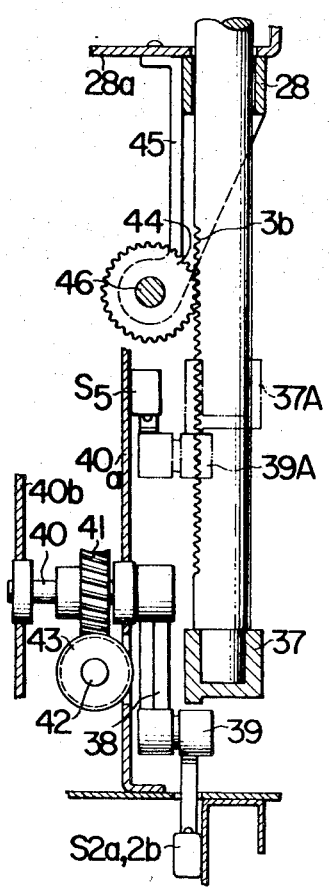

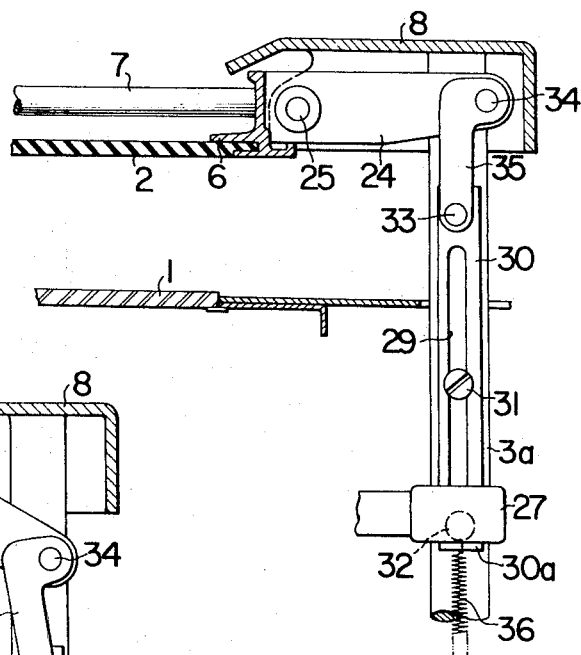
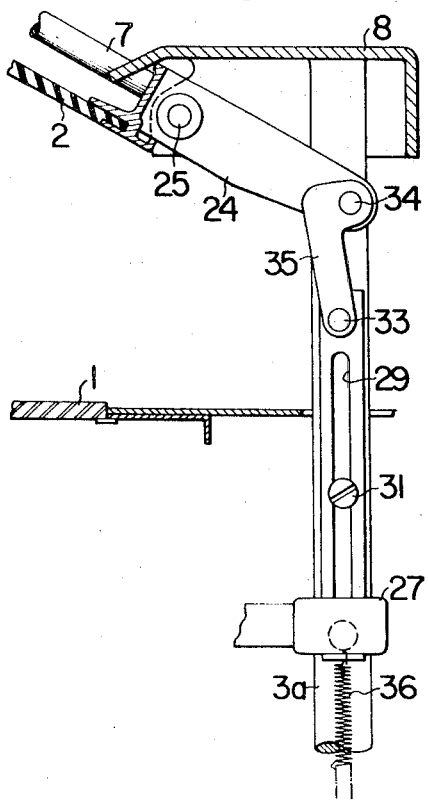
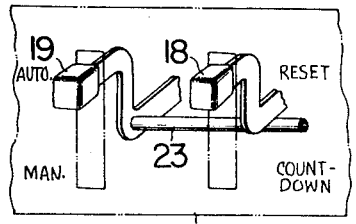

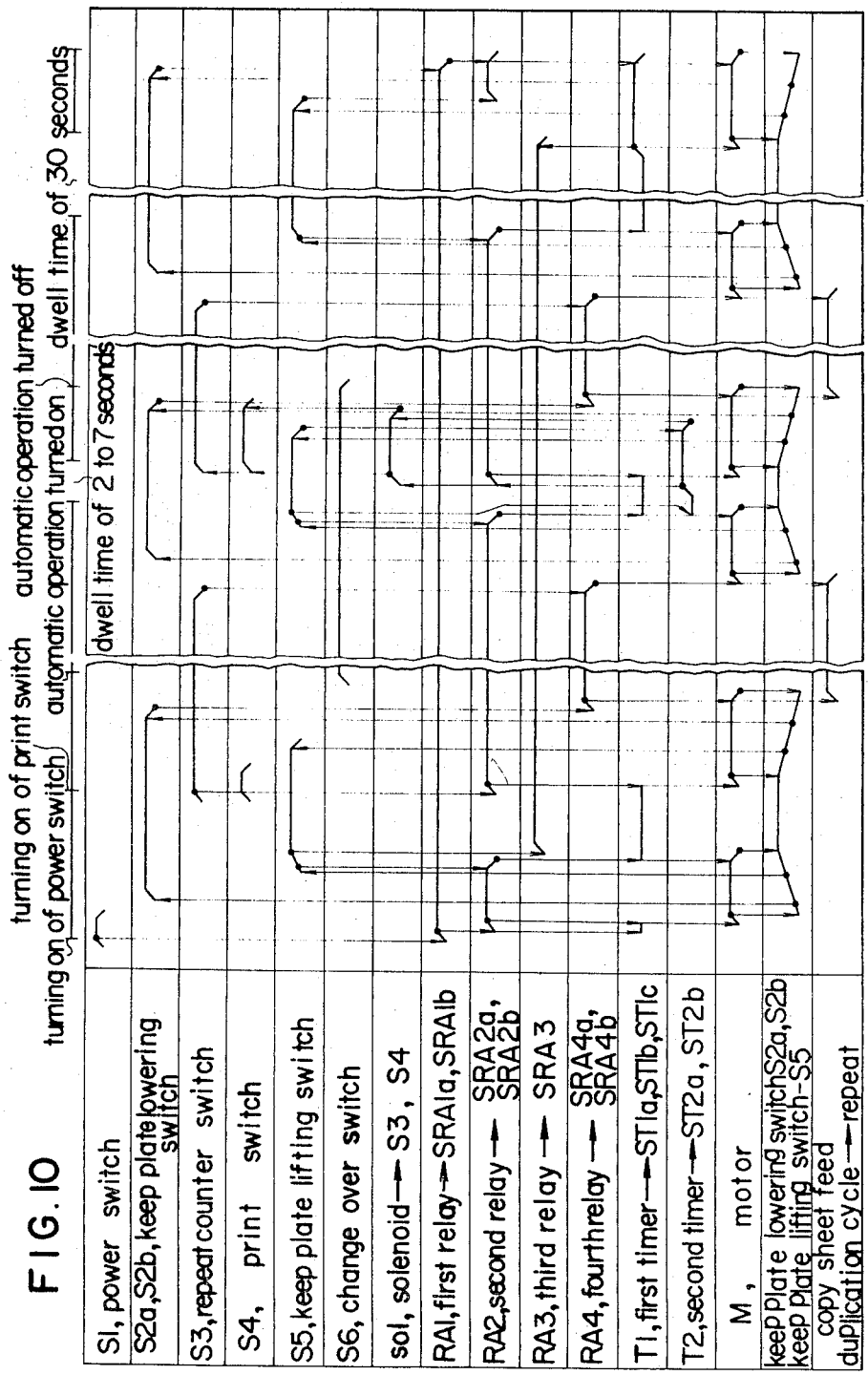

ELECTROPHOTOGRAPHIC COPYING APPARATUS PROVIDED WITH AN AUTOMATIC ELEVATIONAL ORIGINAL KEEP-PLATE

BACKGROUND OF THE INVENTION

This invention relates to an electrophotographic copying apparatus having an original keep-plate which can be moved automatically away from and into contact with the original-receiving exposure surface in a series of operations which permit versatile use of the apparatus in multiple copying.

In an electrophotographic apparatus of the type in which an original is placed on a transparent original receiving surface and exposed to reflected light, it is customary to use a thick, relatively heavy, and soft original keep-plate made as of rubber to hold down an original on the exposure surface. Heretofore, it has been customary to manually operate the original keep-plate, lifting it off the exposure surface before an original is placed thereon and pressing it into contact with the original after being placed on the exposure surface. Such handling of the original keep-plate of the prior art is inconvenient, resulting in reduced efficiency in the copying operation, particularly when multiple copies are to be made of a number of originals.

SUMMARY OF THE INVENTION

The present invention provides an electrophotographic copying apparatus with an original keep-plate which can move automatically away from and into contact with the original receiving exposure by means of an improved drive mechanism and control device including a changeover member for switching the operation of the original keep-plate between manual operation and automatic operation. When the changeover member is set to manual operation, the up-and-down movement of the original keep-plate, which normally rests on the exposure surface, is initiated upon depression of the power switch button and print switch button, permitting the original to be placed on the exposure surface whereupon the keep-plate descends to press the original against the exposure surface and a series of duplication cycles takes place automatically of the one original after which the keep-plate again rises permitting original removal. A series of duplication cycles herein refers to the number of times the duplication cycle takes place till duplicates corresponding in number to which the repeat counter is set are made. The duplication cycle may take place only once as when one duplicate only is made from one original.

When the change-over member is set to automatic operation, the up-and-down movements of the original keep-plate automatically take place a plurality of times with the keep-plate dwelling each time in its upper position for a predetermined period, so that a plurality of series of duplication cycles can take place automatically while originals are exchanged as desired. The operator has only to replace the original on the original exposure surface with a new one each time the original keep-plate moves upwardly and dwells for a predetermined time interval to obtain a plurality of sets of duplicates as desired. Stated differently, the apparatus according to this invention eliminates the troublesome operation of placing an original in a predetermined position by one hand while lifting the original keep-plate by the other. When the apparatus is set to automatic operation, it is possible to obtain a plurality of sets of duplicates with high efficiency.

When a plurality of series of duplication cycles are repeated, it is generally preferable to use a repeat counter of the reset type rather than of the count-down type, because the former does not require that the counter be set again each time one cycle of duplication is finished. In the apparatus according to this invention, the repeat counter can be switched between the count-down type and the reset type, and the reset type is selected when the operation of elevational original keep-plate is set to automatic operation, thereby simplifying operation and precluding mis-operations. These features make it possible to perform duplication with high efficiency.

BRIEF DESCRIPTION OF THE DRAWINGS

FIG. 2 is a sectional view of the upper portion of the original keep-plate drive mechanism.

FIG. 3 is a sectional view of the lower portion of the original keep-plate drive mechanism.

FIGS. 5 and 6 are sectional views of the original keep-plate and the drive mechanism therefore showing the manner of their operation.

FIG. 7 is a perspective view of the coupling means for the change-over member.

FIG. 10 is a diagram showing the operation pattern of various units in the electric circuit of FIG. 9.

DESCRIPTION OF A PREFERRED EMBODIMENT

Figure 1:
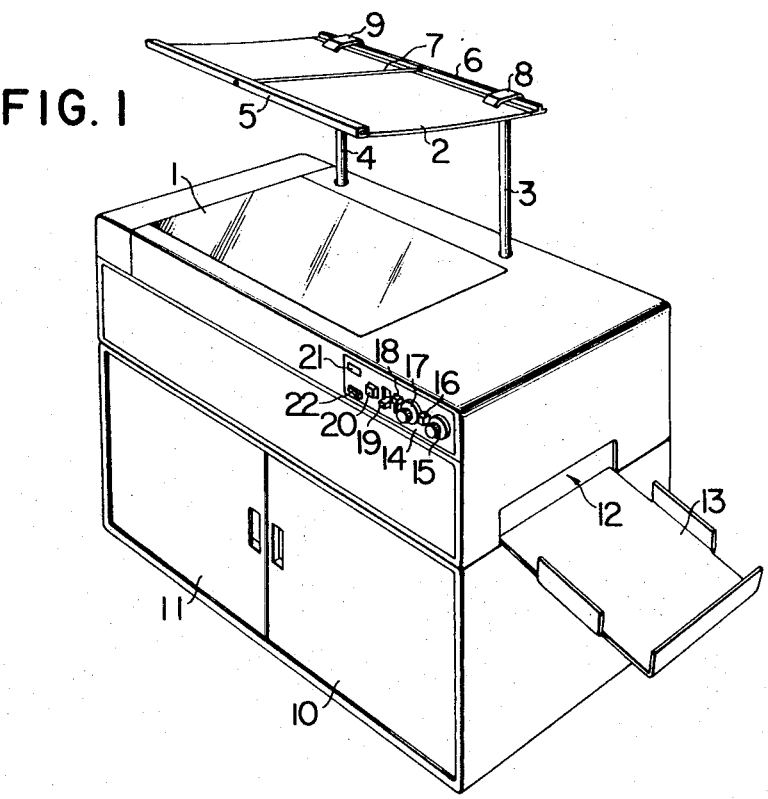
FIG. 1 is a perspective view of an electrophotographic copying apparatus provided with an automatic elevational original keep-plate in accordance with the present invention.

FIG. 1 shows an electrophotographic copying apparatus provided with an automatic elevational original keep-plate in accordance with the present invention. A transparent original receiving exposure surface 1 is provided on the copying apparatus and an original keep-plate 2, corresponding in size and position to the exposure surface or plate 1, is elevationally supported by support rods 3 and 4 which are adapted to move up and down and connected to a rear portion of the apparatus.

Original keep-plate 2 comprises a mat portion made of a flexible material, such as rubber, and having a relatively heavy weight; and frame members 5 and 6 attached to front and rear ends of the mat and connected together by a relatively sturdy connecting rod 7. The keep-Plate 2 constructed as aforementioned is hingedly connected at 8 and 9 to support rods 3 and 4. Hinged doors 10 and 11 are mounted on a front surface of a lower portion of the copying apparatus in which a photosensitive sheet roll (not shown) is housed and ready to be paid out.

An exposing device (not shown) is disposed in the interior of the apparatus in a position immediately below exposure surface 1. A cutter and an electrically charging device (both not shown) are disposed in suitable positions between the exposing device and the aforementioned photosensitive sheet roll and a developing and fixing device (not shown) is disposed on the opposite side of the exposing device. A length of the photosensitive sheet that has moved through the developing and fixing device is discharged through an opening 12 formed in a right side wall of the apparatus into a duplicate receiving tray 13. The aforementioned construction of the electrophotographic copying apparatus is known, and all the units operate in association with each other when a command to initiate duplication is given so that a duplication cycle may take place.

Located at the front surface in the upper right-hand portion of the copying apparatus is an operation panel 14 on which are arranged a contrast control knob 15; a print switch button 16; a repeat counter set knob 17 for a repeat counter which controls the number of cycles to be repeated; a changeover lever 18 for switching between reset and count-down and a change-over lever 19 for switching between manual operation and automatic operation (also shown in FIG. 7); a power switch button 20; and indication lamps 21 and 22. Alternatively, levers 18 and 19 may be pushbuttons, and switch buttons 16 and 20 may be levers. The repeat counter is of the type which can be switched between reset and count-down, so that if change-over lever 18 is moved upwardly, as shown in the figure, the repeat counter is set to reset; and if it is moved downwardly, the counter is set to count-down.

Original keep-plate 2 can be switched to automatic operation if change-over lever 19 is moved upwardly, or it can be switched to manual operation if change-over lever 19 is moved downwardly. In the present invention, change-over lever 18 for the repeat counter is set to the reset position when the original keep-plate is switched to automatic operation. This can be accomplished readily as by securing to lever 19 an engaging member 23 which extends down-below lever 18 as shown in FIG. 7.

The manner in which original keep-plate 2 is supported and the construction and operation of a drive mechanism for keep-plate 2 will be described in detail with particular reference to support rod 3. It is understood, however, that this description will also be applicable to the construction and operation of support rod 4.

In FIG. 2, frame member 6 is shown firmly secured to a front end of a support arm 24 which is pivotally mounted on a support shaft 25 connected to hinges 8 and 9. Hinge 8 is secured by a screw 26 to an upper end of support rod 3 which is supported by being fitted for vertical sliding motion in support rings 27 and 28 (shown in FIG. 3 which, in turn, are firmly secured to a support wall 27a and an immovable member 28a, respectively, of the apparatus.

Support rod 3 includes an upper portion in the form of a planar bar 3a to which a pull member 30, formed with a slot 29, is connected by means of screws 31 and 32 received in the slot 29, so that pull member 30 can move up and down in sliding motion. An upper end portion of pull member 30 and a rear end portion of support arm 24 are connected together by a connecting bar 35 through shafts 33 and 34. A spring 36 is connected to the lower end of pull member 30 so as to urge the member 30 to move downwardly with a weak force. Support rod 4 is connected to original keep-plate 2 in the same manner as described with reference to support rod 3 and is similarly slidable up and down.

Figure 4:
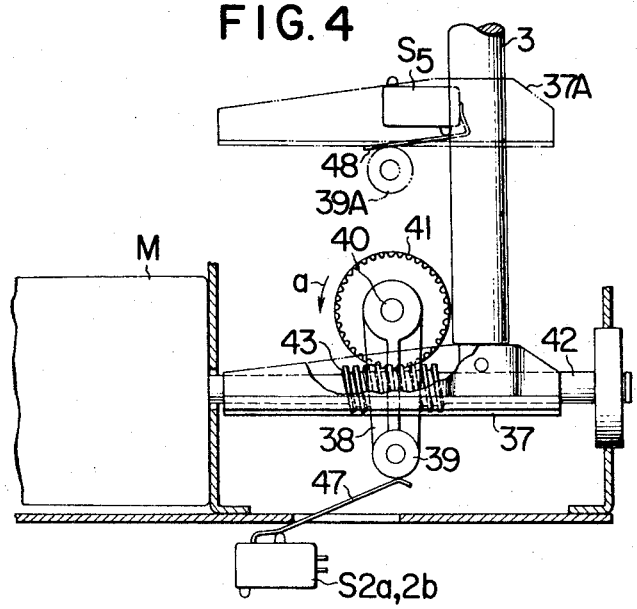
FIG. 4 is a front elevation of the lower portion of the original keep0plate drive mechanism shown in FIG. 3.

Support arm 3 includes a lower portion, shown in FIG. 3, with an arm 37 secured to its lower end and extending horizontally as shown in FIG. 4. A roller 39 mounted at an end of a pivotal arm 38 is disposed below arm 37 as shown in the figures. Arm 38 is supported by a shaft 40, which is rotatably supported by support walls 40a and 40b as shown in FIG. 3, and has a worm gear 41 mounted thereon between support walls 40a and 40b. Maintained in meshing engagement with the worm gear 41 is a worm 43 secured to the shaft 42 of an electric motor M shown in FIG. 4.

Motor M is controlled by a control device subsequently to be described. When motor M receives a command to operate, its rotation will be transmitted to shaft 40 through worm 43 and worm gear 41, such that pivotal arm 38 moves in pivotal motion in the direction of arrow $a$ (FIG. 4) through an angle of 180° about shaft 40 into an upwardly directed position.

Assuming that pivotal arm 38 begins its motion from the position in which roller 39 is maintained in its lowermost position, as shown in FIG. 4, roller 39 will begin to press against and move arm 37 upwardly, thereby causing support rod 3 to move upwardly. A rack 3b is provided on one side of the lower portion of support rod 3 as shown in FIG. 3 and maintained in meshing engagement with a pinion 44. An identical rack and pinion arrangement is provided for the rack of support rod 4, and the two pinions are secured coaxially to a shaft 46, which is rotatably supported by a stay 45, so that the elevational movement of the two support rods 3 and 4, is correctly coordinated. When support rods 3 and 4 move upwardly in the manner described above, original keep-plate 2 also moves upwardly while being maintained in horizontal position as shown in FIG. 5.

At the lower end of pull member 30, which is slidably connected to support rod 3, is an engaging portion 30a which is adapted to engage support ring 27 (FIG. 5) during the upward movement of support rod 3, so that upward movement of pull member 30 is interrupted while support rod 3 is permitted to move further upwardly. This causes connecting bar 35 to be pulled and stick out as shown in FIG. 6, with the result that support arm 24 and original keep-plate 2 are brought to tilting position with their front ends being directed upwardly. A similar operation occurs with respect to support rod 4.

By the time original keep-plate 2 moves upwardly and comes into tilting position as aforementioned, roller 39 has moved to its uppermost position and stops at dash-and-dot line position 39A shown in FIGS. 3 and 4. The position of arm 37 at this time is shown in dash-and-dot lines 37A. When original keep-plate 2 is in this position, an original can be placed on the exposure surface 1 or the previous original can be replaced by a new one.

Figure 8:
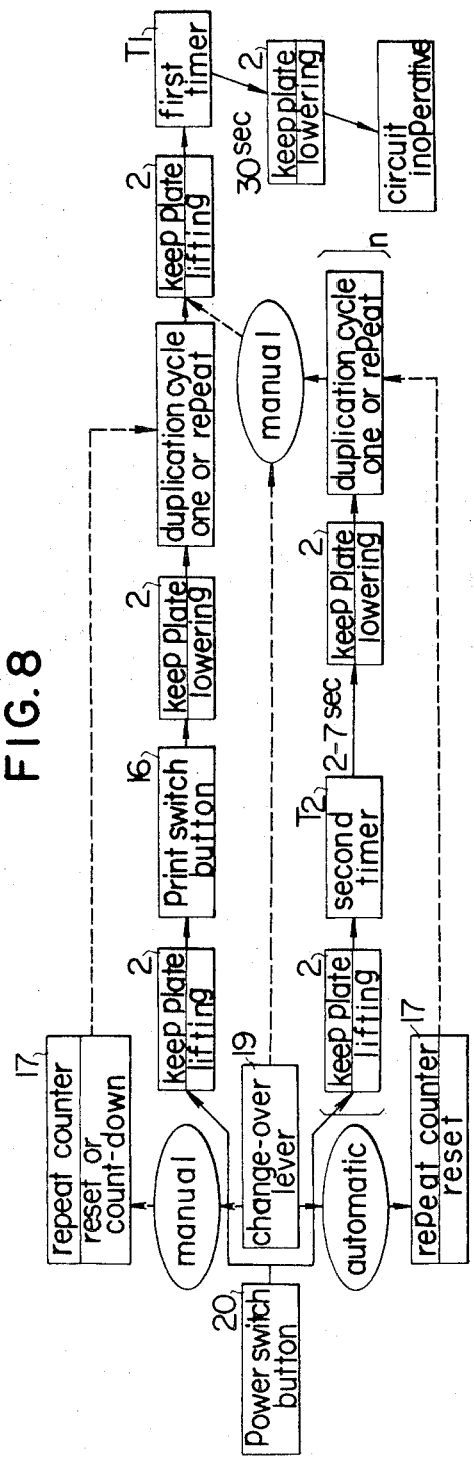
FIG. 8 is a diagram showing the control and operation system for the apparatus according to this invention.

With an original in place on exposure surface 1, a command to start operation is given to motor M and pivotal arm 38 moves in pivotal motion in the direction of arrow $a$ through an angle of 180° from its uppermost position to its lowermost position. In conjunction with the pivotal movement of arm 38, support rods 3 and 4 are moved downwardly in sliding motion mainly by the weight of original keep-plate 2, and original keep-plate 2 is brought into pressing engagement with exposure surface 1. The general operation of this copying apparatus will now be explained briefly with reference to FIG. 8.

The original keep-plate 2 according to this invention is maintained in its lower position in which it is in pressing engagement with exposure surface or plate 1 when the copying apparatus is inoperative. If change-over member 19 shown in FIG. 1 is set to the manual operation position and power switch button 20 is depressed, keep-plate 2 will move upwardly to permit access to exposure surface 1. An original is placed on original receiving surface 1 and repeat counter 17 is set to a number corresponding to the number of duplicates to be made. At this time, change-over lever 18 for repeat counter 17 may be set to either reset or count-down according to the wish of the operator. After the aforementioned preparatory operation is performed, print switch button 16 is depressed. This brings original keep-plate 2 to its lower position in which it holds the original down against exposure surface 1 and at the same time issues a command to start a duplication cycle to all the parts of the apparatus. The duplication cycle is substantially the same as the duplication cycle of conventional electrophotographic copying apparatus and comprises, for example, the steps of copy sheet feed, electric charging, exposure to an optical image, developing and fixing. However, if the repeat counter 17 is set for more than one duplicate then a signal is given to repeat counter 17 when the exposing step is finished, so that the duplicating steps are repeated in accordance with the number to which the repeat counter is set, in slaved relation.

When change-over lever 19 is set to manual operation, a series of duplication cycles, corresponding in number to the number to which the repeat counter 17 is set, takes place and original keep-plate 2 moves upwardly again only upon completion of this series of duplication cycles. As will be explained more fully with respect to FIG. 9, a timer $T_1$ is actuated when original keep-plate 2 moves upwardly, and if original keep-plate 2 is allowed to remain in its upper position beyond a given period of time, over 30 seconds, for example, then it automatically moves downwardly after 30 seconds has elapsed and an electric circuit is opened. Accordingly, no duplication cycle takes place unless print switch button 16 is depressed within the 30 seconds after original keep-plate 2 has moved to its upper position. It is to be understood that the apparatus can be designed to set the dwell time to any time interval as desired.

If change-over lever 19 is set to automatic operation, a second timer $T_2$ is actuated after power switch button 20 is depressed and original keep-plate 2 moves to its upper position. Actuation of timer $T_2$ causes original keep-plate 2 to move downwardly at selected intervals, after dwell times, for example, of 2 to 7 seconds duration, and duplication cycles take place automatically in conjunction with the downward movements of original keep-plate 2. Each time original keep-plate 2 reaches its lower position, a series of duplication cycles corresponding in number to the number to which the repeat count 17 is set take place and original keep-plate 2 moves to its upper position upon completion of each series of duplication cycles. Second timer $T_2$ is actuated each time original keep-plate 2 moves to its upper position so that it is returned to its lower position at regular intervals, thereby permitting a plurality of series of duplication cycles to take place automatically. When a predetermined number of series of duplication cycles have taken place, change-over lever 19 is switched to manual operation. This interrupts the duplication cycles in the same manner as in manual operation.

In this invention, switching between manual operation and automatic operation can be made at any time as desired. This switching operation permits effective operation of the copying apparatus and production of large numbers of duplicates of an original or originals in a short interval off time. According to this invention, repeat counter 17 is necessarily set to reset position, by the arrangement shown in FIG. 7, when change-over member 19 is set to automatic operation, so that the operator can concentrate on replacements of originals without being required to pay attention to the number to which the repeat counter is set as is the case if the repeat counter is of the count-down type.

Figure 9:
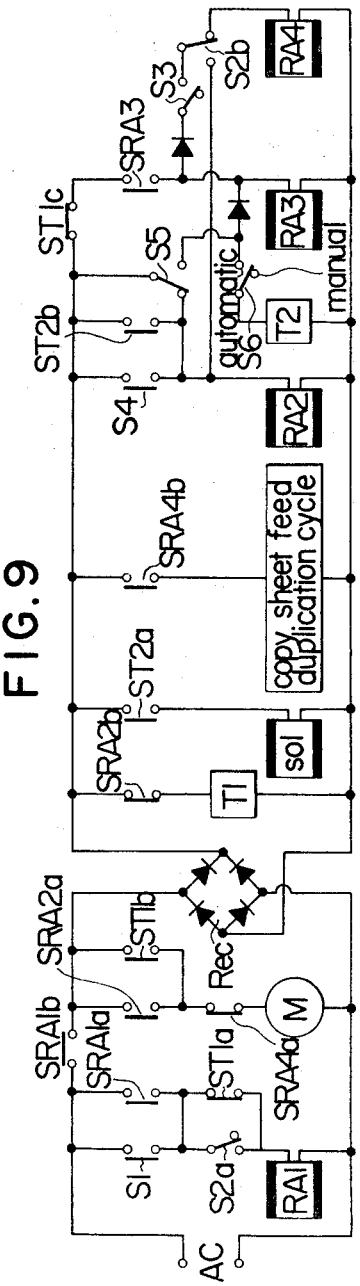
FIG. 9 is a circuit diagram showing the electric circuit for the system shown in FIG. 8.

According to this invention, an electric circuit as shown in FIG. 9, is employed as a control device to permit the copying apparatus to operate as aforementioned. The operation pattern for the components of this electric circuit is shown in FIG. 10. The aforementioned control device will now be described.

In FIG. 9, a DC circuit containing timers $T_1$ and $T_2$ and various control switches and relays is connected through a rectifier to an AC circuit containing a power switch $S_1$ and electric motor M. Rectifier Rec is of the full wave type.

A keep-plate lowering switch S2a connected in series with power switch S1 and a keep-plate lowering switch S2B for switching between relays RA2 and RA4 are operated by an actuator 47 (shown in FIG. 4) which is adapted to be pressed by the roller 39 of pivotal arm 38 when roller 39 is disposed in its lowermost position. A keep-plate lifting switch S5 (also shown in FIG. 4) for switching between relay RA2 and a circuit connecting a relay RA3 to $T_2$, is operated by an actuator 48 which is pressed by roller 39 when the latter is disposed in its uppermost position. Keep-plate lowering switch S2a is a normally closed switch, and keep-plate lowering switch S2b is adapted to connect the circuit to a relay RA4 when actuator 47 is pressed. Keep-plate lifting switch S5 is adapted to connect the circuit to relay RA3 and timer $T_2$ when actuator 48 is pressed.

A change-over switch S6 is adapted to be switched between manual and automatic positions (FIG. 9) as change-over lever 19 is switched between manual operation and automatic operation. Timer $T_2$ is connected with keep-plate lifting switch S5 only when switch 36 is switched to the automatic position. Assuming, then, that change-over switch 19 is set to manual operation so that change-over switch S6 is switched to manual position, the various components will operate in conjunction with one another as follows with reference to FIGS. 9 and 10.

Depression of power switch button 20 closes power switch S1 and energizes a relay RA1 through a normally closed relay contact ST1a. Relay RA1 closes its contacts SRA1a and SRA1b, for self-holding switch SRA1a and at the same time initiating a supply of current to the DC circuit through contact SRA1b. At this time, first timer $T_1$ is instantaneously set in motion through a relay contact SRA2b which is of a normally closed type. At the same time, relay RA2 is energized through keep-plate lifting switch S5 causing its contact SRA2b to be opened, so that the timing opertion of first timer $T_1$ is immediately interrupted and rendered substantially inoperative.

Energization of relay RA2 closes its contact SRA2a in the A.C. circuit and actuates motor M through a normally closed contact SRA4a. Rotation of motor M causes original keep-plate 2 to begin to move upwardly as aforementioned, so that keep-plate lowering switch S2a closes and switch S2b is switched to the relay RA2 side. When original keep-plate 2 has reached its uppermost position, keep-plate lifting switch S5 is turned off, relay RA2 is de-energized and relay RA3 is energized. De-energization of relay RA2 opens its contact SRA2a and renders motor M inoperative, thereby permitting original keep-plate 2 to remain in its upper position. At this time, another contact SRA2b of relay RA2 is closed, thereby setting first timer $T_1$ in motion again. Relay RA3 closes its contact SRA 3 for self-holding.

If 30 seconds elapses after original keep-plate 2 has reached its upper position, first timer $T_1$ opens contacts ST1a and ST1c and closes contact ST1b. Closing of contact ST1b actuates motor M through normally closed contact SRA4a, thereby moving original keep-plate 2 downwardly from its upper position. Opening of contact ST1c releases relay RA3 from self-holding at this time.

When original keep-plate 2 starts its downward movement, keep-plate lifting switch S5 is restored to its original position and relay RA2 is energized, so that its contact SRA2a is closed and its contact SRA2b is opened. Opening of contact SRA2b interrupts the operation of first timer $T_1$, but its contacts ST1a and ST1c remain open and its contact ST1b remains closed.

When original keep-plate 2 reaches its lower position, keep-plate lowering switches S2a and S2b are restored to their original positions, with switch S2a being opened. This de-energizes relay RA1 and opens its contacts SRA1a and SRA1b, thereby rendering all the components of the circuits inoperative.

It will thus be seen that the apparatus can be rendered inoperative by allowing the original keep-plate 2 to stand in its upper position for a predetermined time interval. Therefore, the change-over lever 19 may be switched from automatic operation to manual operation following the production of duplicates of a plurality of originals under automatic operation to achieve apparatus shut-down.

If print switch button 16 is depressed before 30 seconds elapses or before the timing operation of first timer $T_1$ is finished so that original keep-plate 2 is still in its upper position, following closing of power switch S1, a print switch S4 will be closed and duplication cycle will take place in the following manner. Print switch S4 is coupled to a repeat counter switch S3, so that both are closed simultaneously. Closing of switch S3 energizes relay RA2 through keep-plate lowering switch S2b, because the relay switch SRA3 is closed.

Energization of relay RA2 closes its contact SRA2a and actuates motor M through normally closed contact SRA4a. Actuation of motor M begins to move original keep-plate 2 downwardly from its upper position. Energization of relay RA2 also opens its contact SRA2b, thereby interrupting the timing operation of first timer $T_1$.

When original keep-plate 2 begins to move downwardly, keep-plate lifting switch S5 is switched from the relay RA3 side to the relay RA2 side, keep-plate lowering switch S2a is opened and keep-plate lowering switch S2a is opened and keep-plate lowering switch S2b is switched to the relay RA4 side. Relay RA4 is energized and its contact SRA4a is opened, so that motor M is rendered inoperative and original keep-plate 2 is brought into pressing engagement with exposure surface 1. At the same time, contact SRA4b is closed and a command to feed copy sheets is issued to the copy sheet feed device.

A duplication cycle takes place automatically in response to the copy sheet feed operation and in accordance with a predetermined program, and a count signal is issued to repeat counter 17 each time exposing of a copy sheet to an optical image of an original is finished.

When the duplication cycles have been repeated a number of times, equal to the number to which repeat counter 17 is set beforehand, a return signal is given to repeat counter switch S3 which opens the circuit to relay RA4. De-energization of relay RA4 closes its contact SRA4a and actuates motor M, thereby causing original keep-plate 2 to start its upward movement again. On the other hand, contact SRA4b is opened, so that copy sheet feed is interrupted.

In this way, a series of duplication cycles takes place corresponding to the number to which the repeat counter 17 is set prior to print switch button 16 being depressed. The duplication operations will be interrupted if original keep-plate 2 is now left standing in its uppermost position.

Turning now to automatic operation, that is, with changeover lever 19 set to automatic operation. Accordingly, a changeover switch S6 is set at automatic position so as to connect second timer $T_2$ to keep-plate lifting switch S5. The time interval during which original keep-plate 2 dwells in its uppermost position can be controlled, as previously noted, to be between 2 to 7 seconds by second timer $T_2$ and original keep-plate 2 will automatically begin to move downwardly from its upper position after the predetermined time interval has elapsed.

More specifically, if power switch S1 is closed and original keep-plate 2 moves upwardly, then keep-plate lowering switch S2a is closed and keep-plate lowering switch S2b is switched to the relay RA 2 side. This de-energizes relay RA2 and opens its contact SRA2a, thereby rendering motor M inoperative and maintaining original keep-plate 2 in its upper position. At this time, contact SRA2b is closed and first timer $T_1$ is set in motion. Keep-plate lifting switch S5 energizes relay RA3 and actuates timer $T_2$, so that relay contact SRA3 is closed for self-holding and second timer $T_2$ begins a timing operation through change-over switch S6.

Second timer $T_2$ closes its contacts ST2a and ST2b from about 2 to 7 seconds after it begins its timing operation. Closing of contact ST2a energizes a solenoid Sol which simultaneously closes print switch S4 and repeat counter switch S3. Closing of these two switches energizes relay RA2 and its contact SRA2a is closed, so that motor M is rendered operative and original keep-plate 2 begins to move downwardly. At this time, contact SRA2b is opened and the operation of first timer $T_1$ is interrupted.

Downward movement of original keep-plate 2 switches keep-plate lifting switch S5 to the relay RA2 side, thereby interrupting the operation of second timer $T_2$ and energizing relay RA2. Interruption of operation of second timer $T_2$ opens its contacts ST2a and ST2b and de-energizes solenoid Sol, thereby opening print switch S4. When original keep-plate 2 reaches its lowermost position, keep-plate lowering switch S2a is opened and keep-plate lowering switch S2b is switched to the relay RA4 side.

When keep-plate lowering switch S2b is switched to this side, relay RA4 is energized and its contact SRA4a is opened and motor M is rendered inoperative, so that original keep-plate 2 is maintained in its lower position. At this time, contact SRA4b is closed and a command to feed copy sheets is issued. The duplication cycles take place in response to the copy sheet feed. In automatic operation, duplication cycles for one original are repeated a number of times, equal to the number to which repeat counter 17 is set as in manual operation. In addition, automatic operation makes it possible to repeat a plurality of series of duplication cycles for any number of originals as desired if the operater substitutes a new original for the old original on original receiving exposure surface 1 while the original keep-plate 2 is in its elevated position. If desired change-over switch 19 is reset to manual operation at the suitable time, and the copying apparatus is rendered inoperative as aforementioned.

What is claimed is:

1. An electrophotographic copying apparatus of the type comprising power means, duplication means, a transparent original receiving exposure surface, and an original keep-plate disposed over said exposure surface, wherein the improvement comprises:
   a. means supporting said keep-plate for movement with respect to said exposure surface;
   b. drive means connected to said support means for raising and lowering said keep-plate vertically to bring said keep-plate into and out of contact with said exposure surface, and
   c. control means for said drive means whereby said keep-plate is moved upwardly to its upper position from its lower position, in which the plate is in contact with the exposure surface, upon actuation of the power means so as to permit an original to be placed on the original receiving surface, and said keep-plate is moved downwardly from its upper position to its lower position to hold down the original placed on the exposure surface, upon actuation of the duplication means.

2. An apparatus as defined in claim 1, wherein said original keep-plate support means comprises a shaft on which the keep-plate is mounted, rod means supporting said shaft, and linkage means connected to said rod means such that the keep-plate is brought to an upwardly directed tilting position at the terminating stage of its upward movement and to a horizontal position at the initial stage of its downward movement, said linkage means comprising a pull member slidably mounted on rod means, a connecting bar loosely connected at opposite ends thereof to said pull member and said original keep-plate, and a stopper for interrupting the upward movement of said pull member when said rod means moves upwardly.

3. An apparatus as defined in claim 1, wherein said control means comprises a timer means for causing the original keep-plate to move from its upper position to its lower position rendering the apparatus inoperative when a predetermined time interval has elapsed after the keep-plate has moved to its upper position upon completion of a series of duplication cycles.

4. An apparatus as defined in claim 1, wherein said keep-plate drive means comprises a change-over member for switching between automatic operation and manual operation and said control means comprises a timer means coupled to said change-over member, so that when the keep-plate drive means is set to manual operation the keep-plate is moved up and down relative to said exposure surface only at the beginning and end of a series of duplication cycles, and when the keep-plate is moved up and down relative to said exposure surface each time a series of duplication cycles takes place with the keep-plate dwelling for a predetermined time interval in its upper position between each series of duplication cycles.

5. An apparatus as defined in claim 4, comprising a repeat counter capable of being switched between count-down operation and reset operation and wherein said change-over member can be set to automatic position only when said repeat counter is switched to reset operation.

6. An apparatus as in claim 1, wherein said control means comprises switch means actuated by said drive means when said keep-plate is in its upper position and timer means actuated by said switch means for controlling the dwell time and lowering of said keep-plate.

7. An apparatus as in claim 1, wherein said control means comprises an alternating current circuit and a direct current circuit coupled by a rectifier means.

8. An apparatus as in claim 7, wherein said alternating current circuit includes a motor for operating said drive means.

9. An apparatus as in claim 7, wherein said direct current circuit includes timer means for controlling the raising, dwell time, and lowering of said keep-plate.

10. An apparatus as in claim 7, including copy sheet feed means and switch means in said direct current circuit for actuating said copy sheet feed means.

* * * * *